United States Patent [19]

Kikuchi et al.

[11] 4,310,912
[45] Jan. 12, 1982

[54] SERVO SYSTEM FOR RECORDING AND/OR REPRODUCING APPARATUS USING A ROTATABLE RECORDING CARRIER

[75] Inventors: Masahiro Kikuchi, Tokyo; Hitoshi Okada, Chiba; Takao Ihashi, Urawa; Takeo Kaji, Tokyo, all of Japan

[73] Assignee: Sony Corporation, Tokyo, Japan

[21] Appl. No.: 782,438

[22] Filed: Mar. 29, 1977

[30] Foreign Application Priority Data

Apr. 2, 1976 [JP] Japan .................................. 51-37476

[51] Int. Cl.³ .................. H04N 5/76; G11B 21/10
[52] U.S. Cl. ........................................ 369/43; 369/44; 369/45; 360/77; 250/201; 250/202
[58] Field of Search ........................... 358/128, 128.5; 179/100.15, 100.4 E, 100.3 V, 100.1 G; 318/662; 324/61 QS, 61 R; 360/73, 75, 77; 250/201, 202, 570; 369/43, 44, 45

[56] References Cited

U.S. PATENT DOCUMENTS

| 3,187,256 | 6/1965 | Foster | 324/61 QS |
|---|---|---|---|
| 3,873,763 | 3/1975 | Janssen | 358/128 |
| 3,934,262 | 1/1976 | Snopko | 358/4 |
| 3,946,166 | 3/1976 | Wossidlo | 358/128 |
| 3,965,482 | 6/1976 | Burrus | 358/128 |
| 3,983,318 | 9/1976 | Miller | 179/100.3 V |
| 4,005,260 | 1/1977 | Janssen | 179/100.3 V |

*Primary Examiner*—Alan Faber
*Attorney, Agent, or Firm*—Lewis H. Eslinger; Alvin Sinderbrand

[57] ABSTRACT

In a recording and/or reproducing apparatus having a rotated record carrier, for example, in the form of a disc, adapted to have video or other signals optically recorded in successive turns of a spiral track on a surface of the record disc, a recording and/or reproducing transducer or head assembly with an optical system including a movable lens for focusing a light beam at the disc surface and/or a movable mirror for deflecting the light beam so as to cause the latter to scan the track, and a servo system for detecting deviations from the proper focused and/or scanned conditions, for example, due to fluctuations of the rotated record disc in directions normal to, or in the plane of rotation thereof, and for correspondingly displacing the lens and/or mirror, respectively, so as to maintain the proper focused and scanned conditions; such servo system is provided with a gain-frequency characteristic having peaks at a fundamental frequency corresponding to the rotational speed of the record disc and at least at one harmonic of such fundamental frequency so as to improve the accuracy with which the servo system responds to fluctuations of the record disc for maintaining the proper focused and/or scanned condition.

5 Claims, 18 Drawing Figures

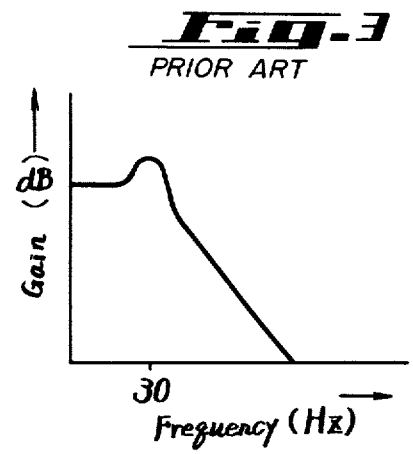
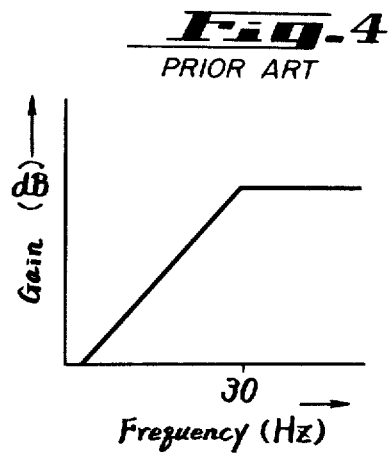
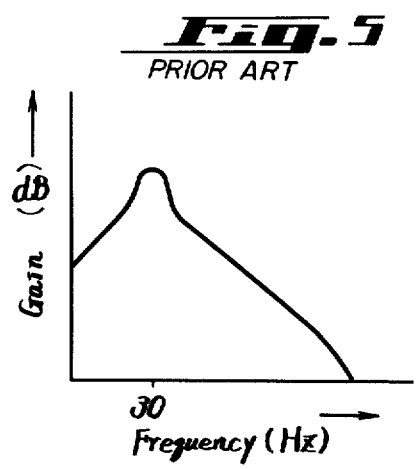
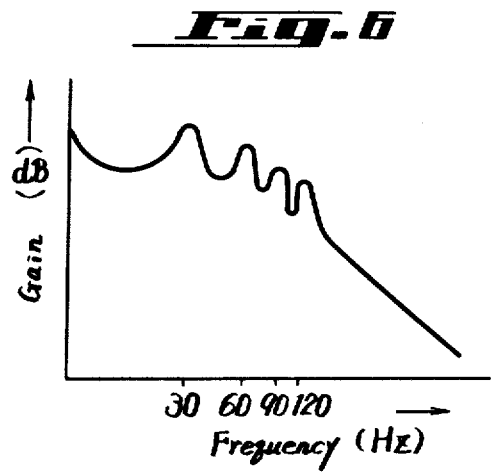
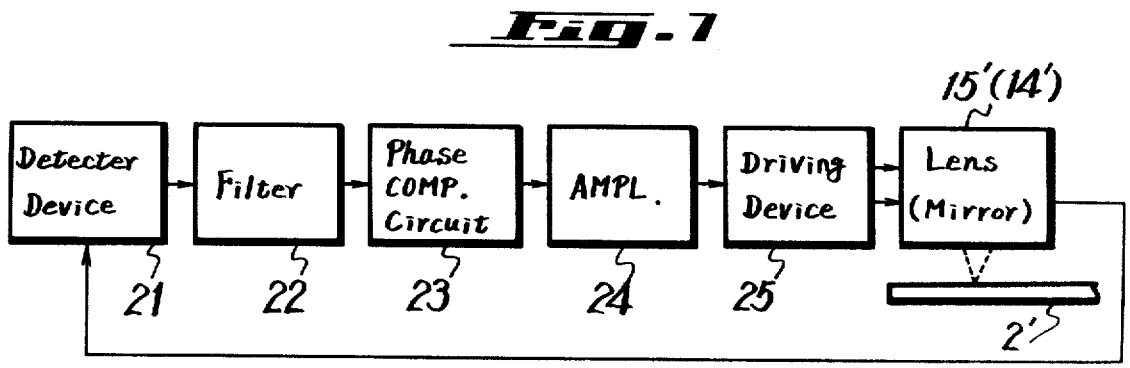

SERVO SYSTEM FOR RECORDING AND/OR REPRODUCING APPARATUS USING A ROTATABLE RECORDING CARRIER

BACKGROUND OF THE INVENTION

1. Field of the Invention

This invention relates generally to a servo for a recording and/or reproducing apparatus which rotates a record carrier, and more particularly, to a servo for displacing a movable element in a transducer head assembly of the apparatus in a sense to eliminate deviations of the transducer from a predetermined condition with respect to the carrier resulting from fluctuations of the carrier upon rotation thereof.

2. Description of the Prior Art

It has ben proposed to record and/or reproduce optical signals from a rotating carrier, for example, a disc, with apparatus having servo mechanisms for displacing a mirror and lens in a transducer head assembly of the apparatus to keep a light beam focused on a predetermined track on the carrier. One example of such apparatus, a video disc recorder, will be used to illustrate the invention.

The proposed video disc recorder operates with a carrier record disc on which video program signals are optically recorded on successive turns of a spiral track on a surface of the record disc. In order to provide a video program of reasonable duration, for example, one half hour, on a disc of reasonable size, for example from 10 cm. to 30 cm. useful diameters, the optical video program signals must be recorded with an extremely high density of, for example, 500 successive turns of the track per radial millimeter of the video disc. An extremely accurate way of following the track is therefore required to obtain the video program signals.

It is therefore proposed to provide a transducer with a laser light which can be focused into a sufficiently tight beam for transducing the optical signals from the track on the disc into electrical video program signals. The transducer is mounted in a head assembly adjacent the disc and, as the disc is rotated to progress each turn of the track past the head assembly, the head assembly is moved radially of the disc to approximately scan the successive turns in the spiral track on the disc with the laser light beam.

The disc is rotated at a high speed in order to obtain sufficient information from the optically recorded signals on the disc for reproducing the video program. (For convenience, the high speed is selected to correspond to the frame frequency of the video picture or 30 rotations per second in the present NTSC video system and 25 rotations per second in the PAL video system.) At the high rotational speed of the disc, the head assembly cannot move accurately enought to direct the light beam onto the narrow track of the high density recording.

Moreover, the position of the track may fluctuate radially of the head assembly from eccentricity or vibration in the arrangement for rotating the disc. For example, a defect in centering a central hole in the disc which is used in the disc rotating arrangement will make each turn of the track eccentric of the disc rotation to cause the position of the track to fluctuate relative to the head assembly at a frequency corresponding to the disc rotation. Similarly, warping or vibration of the disc normal to its plane of rotation will move the disc toward and away from the head assembly, again at a frequency corresponding to the disc rotation, so that the light beam may be inadequately focused on the track of the disc. If an eccentricity in the path of a track relative to the head assembly causes the transducer to scan from one turn of the track to another, the continuity of the video signals will be lost and, if the disc moves too far toward or away from the head assembly, the light beam may focus on more than one turn of the track to produce cross talk between the video signals recorded on the adjacent turns. Both results are clearly undesirable. The transducer therefore must have another way of maintaining proper scan and focus conditions.

It has therefore been proposed to provide the laser transducer with movable mirror and lens elements and servo mechanisms for moving the elements to keep the transducer in the condition with the laser light beam focused on just one turn of the track. More specifically, the transducer directs a lseer light beam onto a half mirror, and from the half mirror to the movable mirror and through the movable lens to the disc. Light reflected from the optical signals recorded on the disc then passes back through the lens to the movable mirror and the half mirror, the reflected light, however, passing through the half mirror to a photodiode for transducing the optical signal into an electrical signal. The servo for moving the movable mirror causes the laser beam to scan the track and the servo for moving the lens maintains the focus of the laser beam on the track.

Inasmuch as rotation of the video disc introduces fluctuations in the position of the disc relative to the head assembly both radially of the disc and normal to its plane of rotation at a fundamental frequency corresponding to the rotational speed of the disc, the movable mirror for scanning the track and the movable lens for focusing the light beam on the track have heretofore been designed with a mechanical resonant frequency at the speed of rotation of the disc. The servos then have a most ready response at the fundamental frequency as indicated by a peak in the gain-frequency characteristic of the servos at the fundamental frequency.

The servos necessarily have some delay in moving the mirror or the lens into the proper scanning and focusing condition. At some high frequency of fluctuation in the track position relative to the head assembly, therefore, the response of the servos will be 180° delayed from that desired. In this condition, the servos will introduce an undesirable oscillation if their gain is greater than one. It has therefore been the practice to provide servos having a peak response at the fundamental frequency corresponding to the speed of rotation of the disc from the mechanical resonant frequency of the movable element of the servo (the mirror or lens) and a decreasing response for higher frequencies so that the gain or response of the servo will be low, for example, less than one, when the frequency of the carrier fluctuation is high enough to cause the response of the servo mechanism to be 180° delayed therefrom. For example, the servo may have an overall gain-frequency characteristic having a peak response at 30 Hz corresponding to the 30 revolutions per second of the disc for the NTSC system from the mechanical resonant frequency and a gain which decreases at 20 dB/Dec for higher frequencies so that the gain will be less than one when the frequency of carrier fluctuations is high enought that the response of the servo is 180° delayed therefrom.

Although the arrangement described may be satisfactory for accommodating fluctuations in the disc at the fundamental frequency corresponding to the speed of rotation of the disc, the actual fluctuations in the disc occur not only at the fundamental frequency, but also at harmonics thereof. With the response of the servo being reduced at higher frequencies, however, the response of the servo may be insufficient to accommodate the fluctuations in the disc at the harmonics of the fundamental frequency. The lens and mirror then will not move sufficiently to maintain the desired scanning and focusing conditions.

Although the transducer arrangement just described transduces recorded optical signals on the disc into electrical signals, it will be understood that a similar arrangement could be used to laser scribe the optical signals on the disc from electrical signals. Such a recording arrangement will also require a way of maintaining the focusing and scanning conditions on the desired track which may be carried out with a servo system similar to that just described. It will therefore be understood that the invention herein described has utility with both recording and reproducing apparatus.

OBJECTS AND SUMMARY OF THE INVENTION

Accordingly, it is an object of the present invention to provide an improved servo for moving an element in recording and/or reproducing apparatus operating with a rotating carrier on which signals may be recorded.

More particularly, it is a further object of this invention to provide an improved servo moving lens and mirror elements to maintain predetermined scanning and focusing conditions of a light beam on an optical signal track on a rotating carrier.

In accordance with an aspect of this invention which is described with reference to apparatus arranged to rotate a carrier adapted to have signals recorded thereon in a predetermined track and having a transducer for recording and/or reproducing signals on the track when in a predetermined condition in respect thereto, a servo is provided for moving an element in the transducer in a sense to eliminate deviations from the predetermined condition due to fluctuations of the carrier from the rotation thereof. The servo has a detector for detecting the deviations from the predetermined condition, a driver for moving the movable element, and a servo control circuit which applies servo control signals to the driver so as to provide the servo with a gain-frequency characteristic having peaks at a fundamental frequency corresponding to the rotational speed of the carrier and at least at one harmonic of the fundamental frequency.

Rotation of the carrier produces fluctuations in the carrier at both the fundamental frequency and at harmonics thereof. For example, an eccentricity in the rotation of the carrier produces fluctuations radially thereof and a warp in the carrier produces fluctuations normal to its plane of rotation which occur at the fundamental frequency and its harmonics. These fluctuations in the carrier cause the carrier to deviate from a predetermined condition with respect to the transducer at corresponding frequencies. By providing a servo having peaks in the gain-frequency characteristic which describes the response of the servo in eliminating the deviations of the transducer from the desired predetermined condition at both the fundamental frequency and its harmonics, therefore, the servo is adapted to have peak responses at frequencies corresponding to the deviations.

The peaks in the gain-frequency response characteristic of the servo are relative to the response of the servo at adjacent frequencies. The overall response of the servo, therefore, may generally decrease from the fundamental frequency so as to have a gain of less than one at a frequency which is sufficiently high that the response of the servo would be delayed 180° from that desired. On the other hand, the peaks may be of the same value with the response falling-off more rapidly thereafter to be less than one at the 180° delayed frequency. Improved operation of the servo mechanism is thereby obtained, while maintaining stable operation of the servo mechanism at high frequencies.

The above, and other objects, features, and advantages of this invention will be apparent in the following detailed description of illustrative embodiments thereof which is to be read in connection with the accompanying drawings.

BRIEF DESCRIPTION OF THE DRAWINGS

FIGS. 2 to 5 show frequency characteristics of the video disc player shown in FIG. 1;

FIG. 6 shows a gain-frequency characteristic of the servo according to the present invention;

FIG. 7 is a schematic block diagram showing an embodiment of the servo of the present invention.

DESCRIPTION OF THE PREFERRED EMBODIMENT

Figure 1:
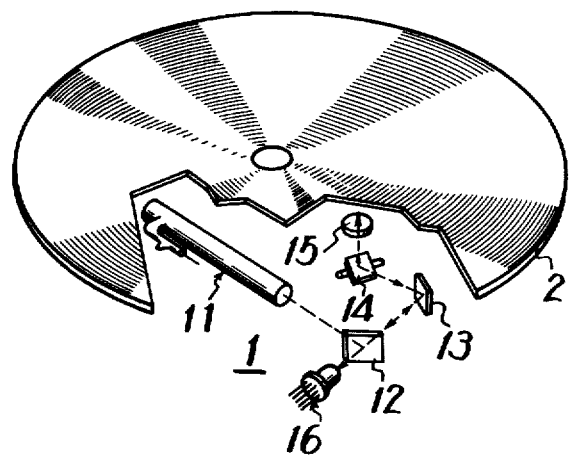
FIG. 1 shows a schematic arrangement of a previously proposed video disc player with which the present invention may be used.

Before describing the preferred embodiments of the present invention, a previously proposed servo system for a video disc player or reproducing apparatus will be described with reference to FIGS. 1 to 5 to illustrate more fully one environment in which the present invention has utility. As schematically shown in FIG. 1, the proposed video disc player has a transducer head assembly at 1 positioned adjacent a carrier disc 2. Optical video program signals have been recorded in a spiral track (not shown) on the underside of the disc with respect to the operative position of the disc shown in FIG. 1. The video disc player is arranged to rotate the disc with respect to the transducer head assembly and the head assembly is arranged to move radially of the disc in synchronism with the rotation of the disc to generally follow the radial progression of the spiral track on the rotating disc.

The transducer head assembly has a laser 11 which emits a light beam toward a half mirror 12. The half mirror reflects the light beam via a mirror 13 to a movable mirror 14 and through a movable lens 15 to the optical signals recorded on the track of the disc. Light reflected from the optical signals recorded on the disc then passes back through the movable lens and mirror to the half mirror 12. The reflected light passes through the half mirror 12 to a photodiode 16 which transduces the reflected light into electrical video program signals corresponding to the optical signals recorded on the disc.

Inasmuch as the video disc player just described merely illustrates one possible environment in which the present invention has utility, the precise structure of the video disc player is not essential to an understanding of the invention. Further description of this nonessential structural environment, however, is provided in the *Journal of the SMPTE*, volume 83, July 1974, pages 564 to 566.

The movable mirror 14 and lens 15 within the transducer just described are arranged to maintain a predetermined condition of the tranducer with respect to the track on the carrier disc. Specifically, a servo system is provided for moving the mirror 15 to keep the light beam directed at the track and thus in a condition scanning the track as it rotates with the disc 2. Another servo system is provided for moving the lens element 15 to keep the light beam focused at the underside of disc 2 and thus in a focused condition for obtaining proper modulation of the reflected light beam by the optical signals recorded on the track.

The servo system associated with the mirror 14 for maintaining the scanning condition of the transducer light beam with respect to the track may be arranged in the way described in U.S. Pat. No. 3,876,842 issued Apr. 8, 1975. As described therein, the light beam from the laser is divided into three beams. A central one of the beams scans the track on the disc as described, and the other two straddle the track to provide signals for positioning the mirror to keep the central beam in the condition scanning the track. Each of the beams follows the optical path described above, gut the light reflected from the beams which straddle the track is received by additional photodiodes (not shown) positioned with respect to the photodiode 16 for receiving the reflected light of the additional beams. Electrical signals from the additional photodiodes are provided to coils (not shown) associated with the movable mirror 14 and the mirror is pivoted in an arrangement like a ballistic galvanometer for cooperating with the coils to move the mirror in a sense to eliminate deviations of the light beams from the desired condition with the central beam scanning the track and the adjacent beams straddling the track.

Another U.S. Pat. No. 3,873,763 issued Mar. 25, 1975 describes an arrangement for moving the lens element 15 to maintain the focused condition of the light beam on the track. As further described in the patent, an electrically conducting plate (not shown) is connected to the lens and extends generally parallel to the adjacent surface of the disc 2 which has an electrically conducting surface. The electrically conducting plate and surface of the sisc form a capacitor having a capacitance which varies with the spacing of the plate and disc surface. The plate and disc capacitor is connected in a capacitive proximity detecting circuit (not shown) which provides a signal to a coil (not shown) connected to the lens. The coil is associated with a magnetic field as in a loudspeaker so that the signals from the detecting circuit move the lens toward and away from the disc to eliminate deviations from the desired focused condition of the beam on the track on the disc.

Figure 2:
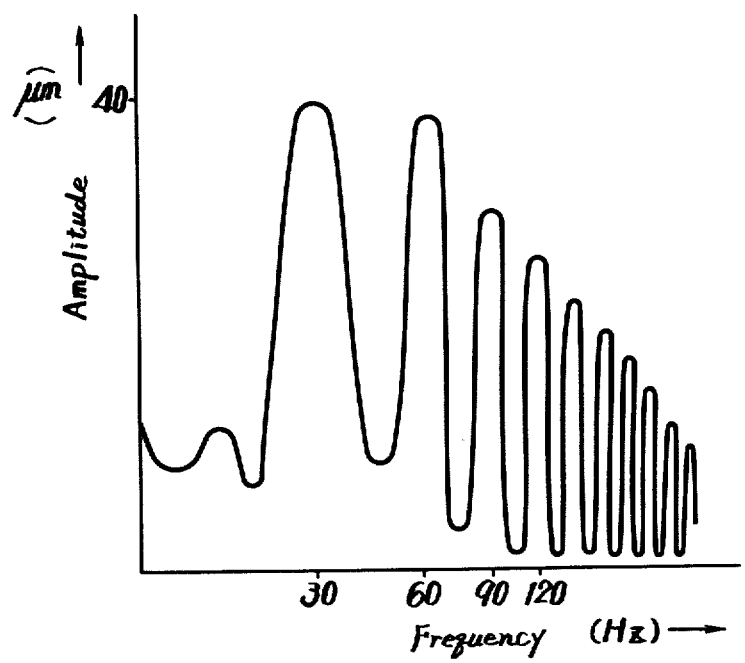

The arrangement (not shown) for rotating the disc 2 may also cause the disc to fluctuate as shown in FIG. 2 in which the amplitude of the fluctuations is shown as a function of the frequency. These fluctuations may occur both radially of the disc as from an eccentricity in the disc rotating arrangement and normally to the plane of rotation of the disc as from a warp in the disc. As may be readily understood by considering fluctuations in the disc from eccentricities or warps in the disc, the fluctuations in the disc occur at a fundamental frequency corresponding to the speed of rotation of the disc and harmonics thereof.

If the disc is arranged to rotate at a speed corresponding to the frame frequency of the video program signals, the signal for each frame of the video program will occupy one turn of the track. To obtain this convenient arrangement, therefore, the disc will be described hereafter as being rotated at a speed corresponding to the frame frequency of the video program signals in the present NTSC system or 30 Hz. FIG. 2 thus shows a peak in the amplitude of the disc fluctuations at a 30 Hz fundamental frequency corresponding to the assumed speed of rotation of the disc and further peaks at harmonics thereof such as 60 Hz, 90 Hz and 120 Hz.

In accordance with prior practice, the mechanical arrangements for moving the mirror and lens elements 14,15 each had a mechanical resonant frequency at the fundamental frequency corresponding to the speed of rotation of the disc to provide a corresponding peak in the gain-frequency characteristic which describes the response of the servos for moving the mirror and lens elements. The response of the servos was also arranged to decrease over a range of frequencies higher than the fundamental frequency to reach a low gain value, preferably less than one, at a frequency high enough that the phase of the response of the servos in moving the lens and mirror elements would be 180° delayed from their deviation from the scanning and focusing consition.

The prior practice just described is illustrated in FIGS. 3 to 5. FIG. 3 shows a gain-frequency or response characteristic of the mechanical arrangement of each of the movable elements (mirror 14 or lens 15). Each element has been arranged to have a mechanical resonant frequency at the fundamental frequency corresponding to the speed of rotation of the disc (30 Hz) as indicated by a corresponding peak in gain or response of the movable elements and a response which falls off over a range of higher frequencies at a rate, for example, of 40 dB/dec. A phase compensation circuit (23 in FIG. 7 as later described) in the previously proposed servos provided a frequency responsive signal for moving the movable element which had no peaks, but was arranged to cooperate with the gain-frequency characteristic of the movable elements to provde the desired fall off to the response at frequencies higher than the fundamental frequency. For the gain-frequency characteristic of either movable element shown in FIG. 3, for example, a gain-frequency characteristic for the phase compensation circuit which increases with frequency to a steady level above the fundamental frequency as shown in FIG. 4 would provide the servo gain-frequency characteristic shown in FIG. 5. The servo gain-frequency characteristic has a peak at the fundamental frequency from the mechanical resonant frequency of the movable element and a response which falls off at higher frequencies at, for example, 20 dB/dec, to reach the desired low value at a frequency high enough to have the 180° phase delay in the response of the servo.

By comparing FIG. 5 with FIG. 2, it is readily seen that the gain-frequency characteristic of the prior servo systems as shown in FIG. 5 did not correspond to the characteristic of the carrier disc fluctuations which produce the deviations which the servos are to eliminate as shown in FIG. 2. Inasmuch as the gain-frequency characteristic of the prior servo systems decreased from the peak at the fundamental frequency, the response of the prior servo system for eliminating the deviation of the lens or mirror elements from the desired scanning and focusing conditions at a peak in the disc fluctuation at one of the higher harmonics of the fundamental frequency, for example, 120 Hz, may be insufficient to move the lens or mirror to eliminate the deviation from the desired scanning and focusing condition.

FIG. 6 shows a gain-frequency characteristic for a servo system according to the present invention. The characteristic has a peak at the fundamental frequency corresponding to the speed of rotation of the disc 2, and also peaks at harmonics thereof, that is, of 60 Hz, 90 Hz, and 120 Hz. The gain-frequency characteristic of the servo according to the present invention as shown in FIG. 6 more closely corresponds to the fluctuations of the disc shown in FIG. 2 than the characteristic of the prior servos shown in FIG. 5. The servo according to the present invention therefore improves the ability of the servo to eliminate deviations from the desired scanning and focusing condition.

FIG. 6 also shows that the gain-frequency characteristic for a servo according to the present invention falls off over a range of frequencies higher than the 30 Hz fundamental frequency, the peaks at the harmonics of the fundamental frequency being relative to the characteristic at adjacent frequencies. Inasmuch as the gain-frequency characteristic falls off at frequencies higher than the fundamental frequency, the response of the servo according to the present invention will reach a low gain, for example less than one, at a frequency high enough to cause the response of the servo to be delayed 180° from the fluctuations in the disc.

FIG. 7 shows a block diagram of the servo system of the invention in which either a mirror or lens element 14',15' is to be moved in a sense to eliminate deviations from a predetermined scanning or focusing condition of the light beam on a track (not shown) on a disc 2', the deviations being caused by fluctuations in the disc 2' upon rotating the disc and therefore having peaks at a fundamental frequency corresponding to the speed of rotation of the disc and harmonics thereof. A detector device 21 (for example, the split beam scanning detector or the capacitive proximity detector previously described) detects the deviations of the light beam from the predetermined scanning or focusing condition and produces corresponding servo control signals which are applied to a driving device 25 for the moving mirror 14 or lens 15 through a servo control circuit. The servo control circuit comprises a series arrangement of a filter 22, a phase compensation circuit 23 and an amplifier 24, and the output of amplifier 24 is applied to driving device 25 which actually transduces the servo control signals into corresponding movement of the lens 15' or mirror 14'. The operation on the servo control signals of the servo control circuit 22,23 and 24 in combination with the driving device 25 is such that the gain-frequency characteristic of the servo has peaks at the fundamental frequency corresponding to the rotational speed of the disc and at least at one harmonic of the fundamental frequency as shown, for example, in FIG. 6.

Operation of the Preferred Embodiments

The operation of several preferred embodiments each having the structure shown schematically in FIG. 7 can now be described. In one embodiment, the filter 22 and phase compensation circuit 23 are arranged to provide, in combination, the gain-frequency characteristic shown in FIG. 8.

Figure 8:
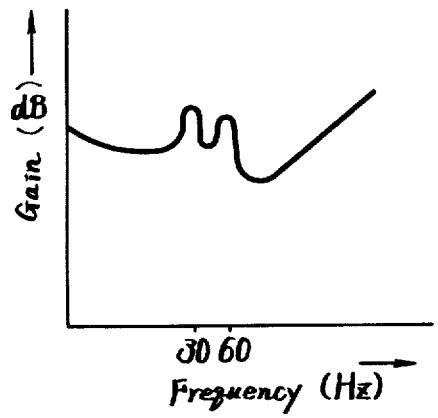
FIGS. 8 to 18 show frequency characteristics of various alternative embodiments of the servo shown in FIG. 7.

As shown in FIG. 8, the gain-frequency characteristic has peaks at the fundamental frequency, 30 Hz, corresponding to the speed of rotation of the disc and at one harmonic thereof, 60 Hz, the peaks being provided by the filter 22 (FIG. 7), it being recalled from the description of the phase compensation circuit 23 (FIG. 7) in respect to prior servo systems that the phase compensation circuit may have a frequency responsive gain, but no peaks therein. As further shown in FIG. 8, the combination of the filter and phase compensation circuit have a gain which generally increases at a rate of 20 dB/dec in a frequency range higher than the peak at 60 Hz.

Figure 9:
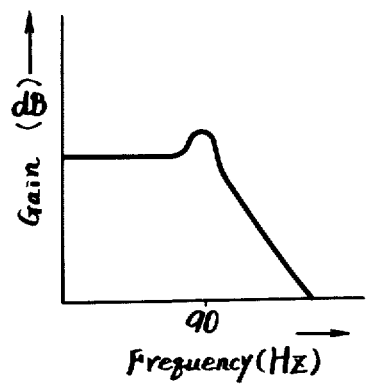

FIG. 9 shows a gain-frequency characteristic for one arrangement of the movable lens or mirror elements. The movable element is designed to have a mechanical resonant frequency at 90 Hz and a response which decreases at higher frequencies at about 40 dB/dec to provide the characteristic shown in FIG. 9 as having a peak at the 90 Hz mechanical resonant frequency and a response which falls off over a frequency range higher than 90 Hz at about 40 dB/dec.

Figure 10:
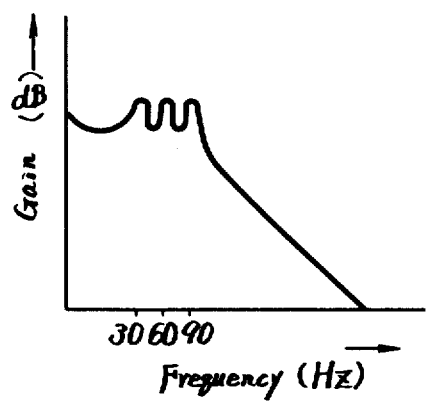

By applying a servo control signal from detector 21 (FIG. 7) to the filter and phase compensation circuit 22,23 (FIG. 7) having the combined gain-frequency characteristic shown in FIG. 8 in the embodiment with a movable mirror 14' or lens 15' (FIG. 7) having the response characteristic shown in FIG. 9, an overall gain-frequency characteristic for the servo system is obtained as shown in FIG. 10. The servo system thus has (a) a gain frequency characteristic with peaks at the fundamental frequency, 30 Hz, corresponding to the speed of rotation of the disc and a first harmonic thereof, 60 Hz, from the operation of the filter and phase compensation circuit and (b) another peak at a second harmonic of the fundamental frequency, 90 Hz, from the mechanical resonant frequency of the lens or mirror element. The peaks correspond to the peaks in the fluctuation of the disc shown in FIG. 2 so that the servo is better able to eliminate deviations from the desired scanning or focusing condition caused by the fluctuation of the disc than the prior servos having the characteristics shown in FIG. 5.

In a frequency range higher than the second harmonic, the gain-frequency characteristic of the present servo (FIG. 10) falls off at a rate of 20 dB/dec so as to reach a low gain at a frequency high enough to have the response of the servo delayed 180° from the disc fluctuation. The peaks in the gain-frequency characteristic of the servo, however, are arranged, for example, by means of amplifier 24 (FIG. 7), to be high enough so that the servo can respond to the corresponding peaks in the fluctuation of the disc to eliminate the deviation from the predetermined scanning or focusing condition.

In the foregoing embodiment, the mechanical resonant frequency of the movable lens or mirror element at 90 Hz was used to provide a corresponding peak in the gain-frequency characteristic of the servo system. In other embodiments, however, the mechanical resonant frequency of the mirror or lens element may be used to provide other peaks to the servo gain-frequency characteristic, for example, a peak at the 30 Hz fundamental frequency as in the prior servo systems, while a further peak at least at one harmonic of the fundamental frequency is then provided by filter 22 of the servo control circuit (FIG. 7) in the way just described.

Figure 11:
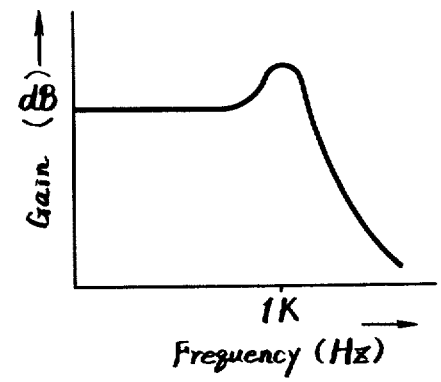
Figure 12:
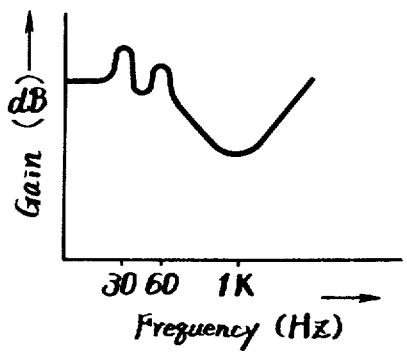
Figure 13:
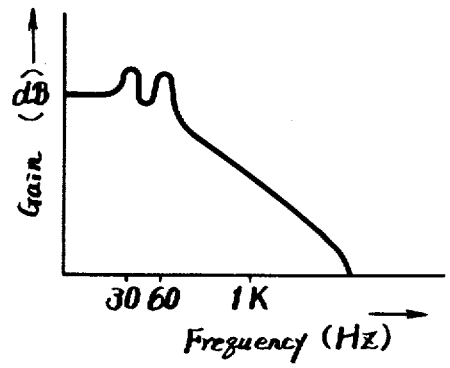

In another embodiment of the invention, the mechanical resonant frequency of the movable mirror or lens element 14', 15' (FIG. 7) may be arranged at a frequency which is not an harmonic of the fundamental frequency and even at a frequency which is higher than the range of frequencies for which the servo system provides response peaks. As shown by the characteristic in FIG. 11, for example, one embodiment of the type just described has a mirror or lens element having a mechanical resonant frequency at 1 KHz and is arranged in combination with amplifier 24 (FIG. 7) to have a substantially flat response up to the 1 KHz mechanical resonant frequency. An appropriate gain-frequency characteristic of the combination of filter 22 and phase compensation circuit 23 (FIG. 7) of the servo control circuit is then shown in FIG. 12 to have peaks at the 30 Hz fundamental frequency and at least at one harmonic thereof, 60 Hz. The characteristic falls off thereafter to 1 KHz and at least increases somewhat at higher frequencies in complement to the peak in the gain-frequency characteristic of the lens or mirror element (FIG. 11) at its mechanical resonant frequency. The overall servo gain-frequency characteristic obtained from this embodiment is thus shown in FIG. 13 to have peaks at the fundamental frequency and one harmonic thereof, 30 Hz and 60 Hz, and to decrease over a range of higher frequencies without a peak corresponding to the mechanical resonant frequency of the mirror or lens element, the peak from the mechanical resonant frequency of the mirror or lens element being compensated for by the complementary characteristics of the servo control circuit at that frequency.

Figure 14:
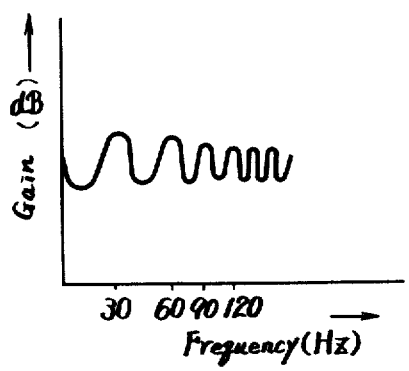
Figure 15:
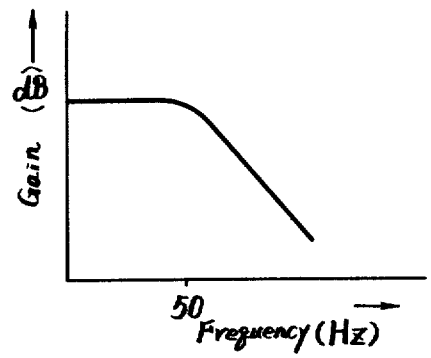
Figure 16:
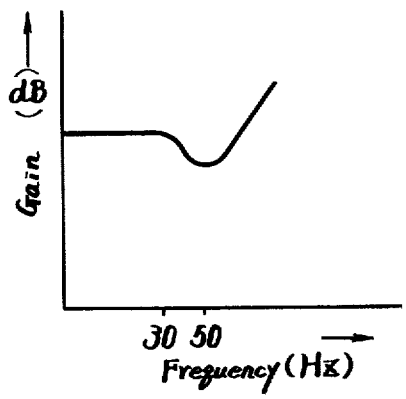
Figure 17:
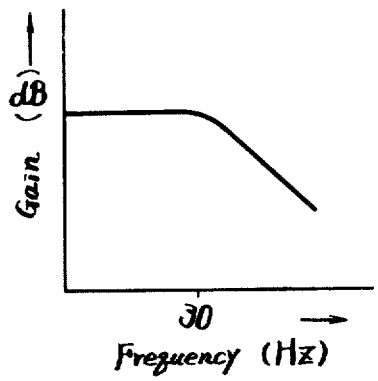
Figure 18:
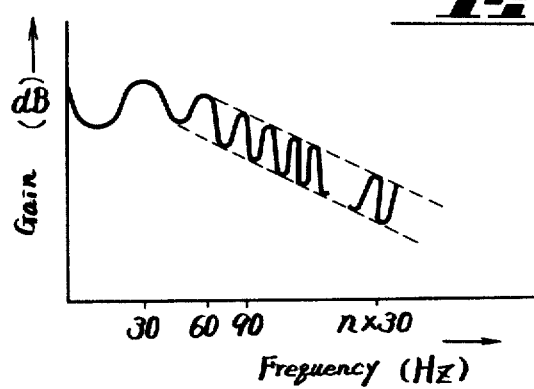

In still another preferred embodiment, the filter 22 of the servo control circuit (FIG. 7) may be a comb filter having a delay device such as a bucket brigade device to provide a gain-frequency characteristic which, as shown in FIG. 14, has peaks at a 30 Hz fundamental frequency corresponding to the speed of rotation of the disc and harmonics thereof. The mirror or lens element is then arranged to have a non-harmonic mechanical resonant frequency, for example at about 50 Hz, and, in combination with amplifier 24 (FIG. 7), a flat response at lower frequencies as shown in FIG. 15. The phase compensation circuit 23 (FIG. 7) is arranged to have the complementary gain-frequency characteristic shown in FIG. 16 to provide a gain-frequency characteristic for the combination of phase compensation circuit 23 and driving device 25 for mirror 14' or lens 15' as shown in FIG. 17. The servo in this embodiment will then have the gain-frequency characteristic shown in FIG. 18 which has peaks at the 30 Hz fundamental frequency and harmonics thereof. The peaks at the harmonics, however, decrease at a rate of about 20 dB/dec over a frequency range higher than about 30 Hz to reach the desired low gain at the 180° phase delay frequency.

The preferred embodiments of the invention have been described with reference to reproducing apparatus which transduces signals, and particularly video program signals, between an optical mode and an electrical mode as shown in FIG. 1. It will be understood, however that the invention may also be applied to recording and/or reproducing apparatus for other signals or for transduceing the signals into other modes such as, for example, magnetic signals on a magnetic recording carrier.

Although illustrative embodiments of the invention have been described in detail herein with reference to the accompanydrawings, it will be understood that the invention is not limited to those precise embodiments, and that various changes and modifications may be effected therein by one skilled in the art without departing from the scope or spirit of the invention as defined in the appended claims.

What is claimed is:

1. In apparatus having means for rotating a record carrier adapted to have signals recorded thereon in a predetermined track, and transducer means for recording and/or reproducing signals in said track when in a predetermined condition in respect to the latter and including an element which is movable for establishing said condition; servo means comprising detector means for detecting deviations from said predetermined condition of said transducer means in respect to said carrier due to fluctuations of said carrier occurring upon the rotation thereof, and producing corresponding servo control signals, drive means responsive to said servo control signals for displacing said movable element in the sense to eliminate said deviations from said predetermined condition, and a servo control circuit applying said servo control signals to said drive means, said drive means and servo control circuit having respective gain-frequency characteristics which combine to provide said servo means with a resultant gain-frequency characteristic having peaks at a fundamental frequency corresponding to the rotational speed of said carrier and at least at one harmonic of said fundamental frequency, said peaks in said resultant gain-frequency characteristic being relative to the response of said servo means at frequencies adjacent said peaks, and said resultant gain-frequency characteristic falling off with increasing frequencies to provide said servo means with a gain less than one at a frequency which is sufficiently high to cause the response of said servo means to said deviations to be delayed 180° from the latter.

2. Apparatus as in claim 1; in which said drive means has a mechanical resonant frequency at said fundamental frequency so as to provide the respective peak of said resultant gain-frequency characteristic, and said servo control circuit has a gain-frequency characteristic with a peak at each said harmonic of said fundamental frequency.

3. Apparatus as in claim 1; in which said drive means has a mechanical resonant frequency at a harmonic of said fundamental frequency so as to provide the respective one of said peaks, and said servo control circuit has a gain-frequency characteristic with a peak at least at said fundamental frequency.

4. Apparatus as in claim 1; in which said servo control circuit has a gain-frequency characteristic with a peak at each of said peaks of said resultant gain-frequency characteristic of the servo means.

5. Apparatus as in claim 4; in which said drive means has a mechanical resonant frequency at a frequency which is non-harmonic in respect to said fundamental frequency.

* * * * *